Patented July 17, 1934

1,967,205

UNITED STATES PATENT OFFICE

1,967,205

PRODUCTION OF DICALCIUM PHOSPHATE AND AMMONIUM SULPHATE

Jacob Hagens and Ludwig Rosenstein, San Francisco, and Wilhelm Hirschkind, Antioch, Calif., assignors to The Barrett Company, New York, N. Y., a corporation of New Jersey No Drawing. Original application May 12, 1927, Serial No. 190,960, now Patent No. 1,699,393. Divided and this application August 10, 1928, Serial No. 298,868

1 Claim. (Cl. 71—7)

This invention relates to a process for the production of dicalcium phosphate and ammonium sulphate from phosphoric acid (or its calcium acid salts), calcium sulphate and ammonia.

This case is a division of application, Serial No. 190,960, filed May 12, 1927 by these applicants, now Patent No. 1,699,393.

The products which result from this process, namely dicalcium phosphate and ammonium sulphate, are each valuable fertilizing materials in themselves and the mixture of these two substances as produced by our process is especially valuable because of the intimacy of the association. They each have uses other than as fertilizing materials. Thus, for example, pure dicalcium phosphate is readily transformed by phosphoric acid into monocalcium phosphate which is a common ingredient of baking powders; ammonium sulphate, besides being used as a fertilizer ingredient, also enters into the production of ammonium nitrate and other ammonium products. They are readily separated by taking advantage of the fact that dicalcium phosphate is insoluble while ammonium sulphate is readily soluble in water.

Dicalcium phosphate is referred to in the fertilizer trade as "citrate soluble phosphate" and the term will be used hereafter in this sense.

The process to be described produces a material which may be used directly as a fertilizer or as an ingredient in mixed fertilizers; or the constituents thereof may be separated by dissolving the ammonium sulphate with water and crystallizing it.

This invention is based on the discovery that a reaction between phosphoric acid, gypsum and ammonia occurs under the proper conditions to produce the above named products. The reaction may be written as follows:

I. $H_3PO_4 + CaSO_4 + 2NH_3 = CaHPO_4 + (NH_4)_2SO_4$

We have found that this reaction proceeds rapidly and smoothly to completion. Its rate is greatly increased by the presence of a certain amount of water and we, therefore, prefer to operate the process with commercial 80% phosphoric acid and calcium sulphate which contains its usual two molecules of water of crystallization, but we in no wise limit our invention to the exclusive use of these materials.

The dicalcium phosphate produced by this process is still capable of reacting with further quantities of calcium sulphate and ammonia to form tricalcium phosphate and a further quantity of ammonium sulphate, as shown by the following reaction:

II. $2CaHPO_4 + CaSO_4 + 2NH_3 =$
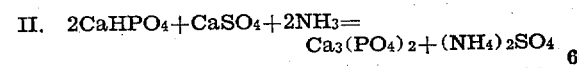
$Ca_3(PO_4)_2 + (NH_4)_2SO_4$ but as tricalcium phosphate is generally considered undesirable for fertilizer purposes and also is not as economical for other uses as dicalcium phosphate, our invention includes the limitation of conditions so that reaction I preponderates and reaction II will be substantially excluded. This we accomplish by either:

a. Discontinuing the introduction of ammonia when substantially two molecular weights thereof have been absorbed for each molecular weight of phosphoric acid; or, b. By mixing the calcium sulphate and phosphoric acid in such proportions that there is substantially one molecular weight of phosphoric acid to each molecular weight of calcium sulphate.

As before indicated when these conditions are maintained reaction II is practically excluded.

Referring back to reaction I, this may be considered as taking place in two stages. The first being neutralization of phosphoric acid by ammonia which may be written as follows:

IA. $H_3PO_4 + 2NH_3 = (NH_4)_2HPO_4$ di-ammonium hydrogen phosphate.

Secondly, a reaction between di-ammonium-hydrogen phosphate with calcium sulphate, which may be written.

IB. $(NH_4)_2HPO_4 + CaSO_4 = CaHPO_4 + (NH_4)_2SO_4$
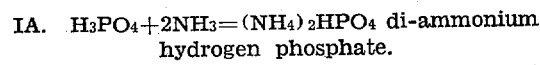

and as a matter of fact our process may be carried out in two steps. First neutralizing phosphoric acid with ammonia to produce solid di-ammonium-hydrogen phosphate and then bringing the latter solid compound into intimate contact with solid gypsum. Reaction IB will then take place, especially if a small amount of water be added to catalyze it.

Certain of the calcium acid salts of phosphoric acid, more especially monocalcium phosphate, will react similarly to phosphoric acid and may be substituted for it provided the limitations mentioned in the previous paragraph are adhered to so that the formation of tricalcium phosphate is avoided. The reaction with monocalcium phosphate is then as follows:

III. $CaH_4P_2O_8 + CaSO_4 + 2NH_3 =$
$2CaHPO_4 + (NH_4)_2SO_4$
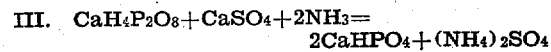

Ordinary commercial acid phosphate is a mixture containing monocalcium phosphate and calcium sulphate in such proportions that there are present approximately two molecular weights of calcium sulphate to each molecular weight of water soluble $P_2O_5$ and ordinarily contains but a small amount of free acid. Therefore, when commercial acid phosphate is to be used in this process it must first be mixed with the proper amount of phosphoric acid or material containing a high percent of water soluble $P_2O_5$; or it may be used as commercially produced provided the absorption of ammonia be stopped when substantially two molecular weights of ammonia have been absorbed for each molecular weight of water soluble $P_2O_5$.

A mixture especially suited for the above described process is produced by treating raw phosphate rock or bone phosphate with a mixture of phosphoric acid and sulphuric acid in such proportions that in the final product the molecular ratio of water soluble $P_2O_5$ and calcium sulphate shall be one to one. In this case the reaction that takes place is as follows:

IV. $2Ca_3(PO_4)_2 + 2H_3PO_4 + 3H_2SO_4 = 3CaH_4P_2O_8 + 3CaSO_4$

When reaction I takes place heat is liberated. Since it is undesirable to allow the mixture to get too hot provisions must be made for removing such heat by proper cooling methods in those cases where undue heat is generated. It is also highly desirable to keep the reacting mixture in a state of agitation during the reaction particularly when treating commercial acid phosphate material with liquid anhydrous ammonia but as types of equipment for carrying on the reaction are not within the scope of the present invention, means of effecting cooling and agitation will not be further described. By providing for agitation of the reacting mixture during ammoniation absorption of the ammonia is made possible with no material loss of ammonia or localized overheating of the mass even when the ammonia is supplied as liquid anhydrous ammonia.

The ammonia which enters into this reaction may be supplied either as pure gas, as diluted gas or as liquid anhydrous ammonia. We prefer to work with ammonia as a diluted and humidified gas carrying an amount of inert gas sufficient, or nearly sufficient, to carry off the heat of the reaction.

Having thus described our invention we claim as follows:

The process of making fertilizer consisting in mixing a ground solid commercial acid phosphate with anhydrous ammonia in liquid form, the amount of such ammonia being at least sufficient to neutralize the free acid, but less in amount than that which would require added extraneous cooling of the mixture to prevent substantial revision of the available phosphate to unavailable form, and maintaining the reaction mixture in a state of agitation during the reaction whereby absorption of the liquid anhydrous ammonia is effected.

JACOB HAGENS.
LUDWIG ROSENSTEIN.
WILHELM HIRSCHKIND.

CERTIFICATE OF CORRECTION.

Patent No. 1,967,205.      July 17, 1934.

JACOB HAGENS, ET AL.

It is hereby certified that error appears in the printed specification of the above numbered patent requiring correction as follows: Page 2, lines 102-103, the claim, for "revision" read reversion; and that the said Letters Patent should be read with this correction therein that the same may conform to the record of the case in the Patent Office.

Signed and sealed this 7th day of August, A. D. 1934.

Leslie Frazer (Seal)      Acting Commissioner of Patents.

ture containing monocalcium phosphate and calcium sulphate in such proportions that there are present approximately two molecular weights of calcium sulphate to each molecular weight of water soluble $P_2O_5$ and ordinarily contains but a small amount of free acid. Therefore, when commercial acid phosphate is to be used in this process it must first be mixed with the proper amount of phosphoric acid or material containing a high percent of water soluble $P_2O_5$; or it may be used as commercially produced provided the absorption of ammonia be stopped when substantially two molecular weights of ammonia have been absorbed for each molecular weight of water soluble $P_2O_5$.

A mixture especially suited for the above described process is produced by treating raw phosphate rock or bone phosphate with a mixture of phosphoric acid and sulphuric acid in such proportions that in the final product the molecular ratio of water soluble $P_2O_5$ and calcium sulphate shall be one to one. In this case the reaction that takes place is as follows:

IV. $2Ca_3(PO_4)_2 + 2H_3PO_4 + 3H_2SO_4 = 3CaH_4P_2O_8 + 3CaSO_4$

When reaction I takes place heat is liberated. Since it is undesirable to allow the mixture to get too hot provisions must be made for removing such heat by proper cooling methods in those cases where undue heat is generated. It is also highly desirable to keep the reacting mixture in a state of agitation during the reaction particularly when treating commercial acid phosphate material with liquid anhydrous ammonia but as types of equipment for carrying on the reaction are not within the scope of the present invention, means of effecting cooling and agitation will not be further described. By providing for agitation of the reacting mixture during ammoniation absorption of the ammonia is made possible with no material loss of ammonia or localized overheating of the mass even when the ammonia is supplied as liquid anhydrous ammonia.

The ammonia which enters into this reaction may be supplied either as pure gas, as diluted gas or as liquid anhydrous ammonia. We prefer to work with ammonia as a diluted and humidified gas carrying an amount of inert gas sufficient, or nearly sufficient, to carry off the heat of the reaction.

Having thus described our invention we claim as follows:

The process of making fertilizer consisting in mixing a ground solid commercial acid phosphate with anhydrous ammonia in liquid form, the amount of such ammonia being at least sufficient to neutralize the free acid, but less in amount than that which would require added extraneous cooling of the mixture to prevent substantial revision of the available phosphate to unavailable form, and maintaining the reaction mixture in a state of agitation during the reaction whereby absorption of the liquid anhydrous ammonia is effected.

JACOB HAGENS.
LUDWIG ROSENSTEIN.
WILHELM HIRSCHKIND.

CERTIFICATE OF CORRECTION.

Patent No. 1,967,205.  July 17, 1934.

JACOB HAGENS, ET AL.

It is hereby certified that error appears in the printed specification of the above numbered patent requiring correction as follows: Page 2, lines 102-103, the claim, for "revision" read reversion; and that the said Letters Patent should be read with this correction therein that the same may conform to the record of the case in the Patent Office.

Signed and sealed this 7th day of August, A. D. 1934.

Leslie Frazer

Acting Commissioner of Patents.

(Seal)